(12) United States Patent  
Mori

(10) Patent No.: US 6,539,208 B1
(45) Date of Patent: Mar. 25, 2003

(54) PORTABLE TELEPHONE APPARATUS

(75) Inventor: Tatsuya Mori, Shizuoka (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 09/713,703

(22) Filed: Nov. 15, 2000

(30) Foreign Application Priority Data

Nov. 16, 1999 (JP) .......................................... 11-324914

(51) Int. Cl.$^7$ ................................................. H04B 1/38
(52) U.S. Cl. ..................... 455/90; 455/550; 455/556; D14/137; D14/138; 379/433.04; 379/433.11
(58) Field of Search ..................... 455/90, 550, 566, 455/575, 95; D14/137, 138; 379/433.01, 433.02, 433.04, 433.12, 433.13

(56) References Cited

U.S. PATENT DOCUMENTS

| 5,260,998 | A | | 11/1993 | Takagi |
| 5,923,751 | A | * | 7/1999 | Ohtsuka et al. ......... 379/433.13 |
| 5,995,373 | A | * | 11/1999 | Nagai .......................... 361/755 |
| 6,094,586 | A | * | 7/2000 | Nishiyama et al. ......... 455/566 |
| 6,233,469 | B1 | * | 5/2001 | Watanabe ................... 455/575 |
| D460,444 | S | * | 7/2002 | Nagai et al. ............... D14/248 |
| 6,469,910 | B2 | * | 10/2002 | Lefort .......................... 455/90 |

FOREIGN PATENT DOCUMENTS

| EP | 0588210 | 3/1994 |
| GB | 2289595 | 11/1995 |
| GB | 2324674 | 10/1998 |
| JP | 7-288860 | 10/1995 |
| JP | 11-17577 | 1/1999 |
| JP | 11-163985 | 6/1999 |

* cited by examiner

Primary Examiner—William Trost
Assistant Examiner—Congvan Tran
(74) Attorney, Agent, or Firm—Dickstein, Shapiro, Morin & Oshinsky, LLP.

(57) ABSTRACT

A portable telephone allowing the increase of the number of key buttons and the expansion of the area of the display window simultaneously is disclosed. The portable telephone is composed of three units: display unit, speaker unit, and body. The three units are connected at variable angles by means for two hinge shafts. Additionally, the lateral walls are formed on the body to generate friction between the units. Consequently, the tilt angle of the display unit with respect to the body can be held stably to further improve visibility for the user.

17 Claims, 7 Drawing Sheets

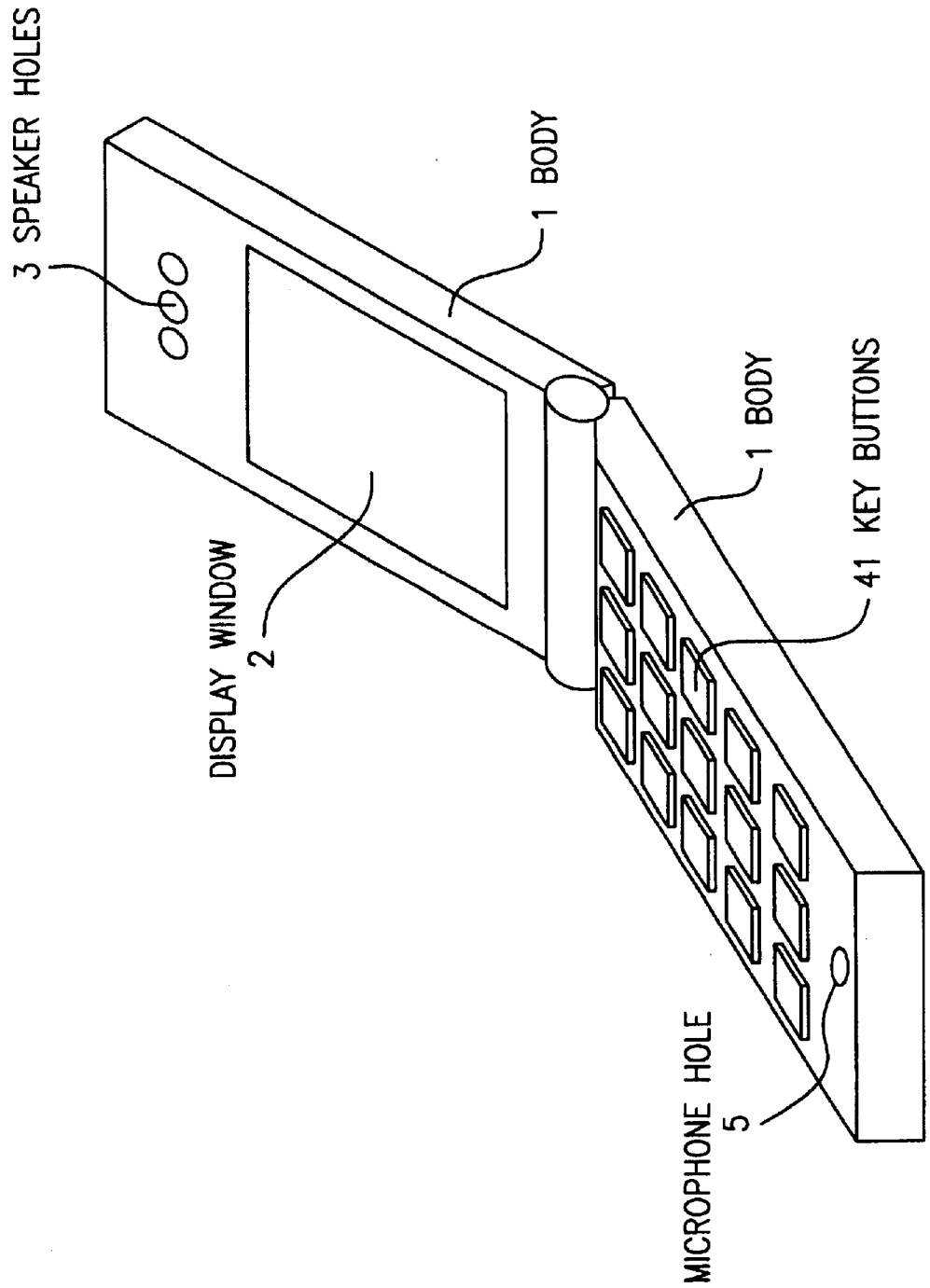

PORTABLE TELEPHONE APPARATUS

BACKGROUND OF THE INVENTION

1. Field of the Invention

The present invention relates to a portable telephone apparatus that has data communication and display functions. More particularly, it relates to a structure of an easy-to-handle portable telephone that has a display of increased visibility.

2. Description of the Prior Art

With a spread of portable telephones, several types of portable telephones with different body structures have recently been developed. For example, a standard type portable telephone shown in FIG. 1 employs a layout that concentrates functions on a major surface of a body 1 with a microphone hole 5, a keypad 41, a display 2, and speaker holes 3 disposed in sequence on the major surface of the body 1.

Along with a recent demand for multifunction in the field of portable telephones, however, there is a growing demand for capabilities to display characters of e-mail and the like and images received through the Internet and the like in addition to the capability of normal voice communications. For character and image display, it is desirable to maximize a display area, but with standard type portable telephones, there is a limit to an increase in a size of the display 2 because an area occupied by the keypad 41 is required to some extent.

To solve such a problem, a portable telephone with a movable cover as shown in FIG. 2 has been developed. Specifically, a movable cover 14 is attached to the lower end of the body 1 via a hinge 63 so that it can be opened and closed. Infrequently used keys 42 are disposed in a part of the body covered by the movable cover 14 and frequently used keys 43 are disposed on the surface of the movable cover 14. This configuration allows the number of control keys to be increased, making it easier to add extra functions.

Folding type portable telephones as shown in FIG. 3 have also been developed to allow keys to be added and the display area to be increased. The portable telephone of this type consists of two housings that can be opened and closed: one of them is equipped with a display 2 and the other is equipped with a keypad, etc.

Besides, Japanese Patent Application Laid-Open No. 7-288860 discloses a portable telephone in which a first housing equipped with a keypad and a second housing equipped with a display are connected by a hinge passing through them vertically so that both housings can pivots in the same plane. Also, Japanese Patent Application Laid Open No. 11 163985 proposes a structure in which a first body equipped with a display and a telephone receiver allows a second body equipped with an operating section and a telephone transmitter to be slidably housed therein.

However, with portable telephones having a movable cover as shown in FIG. 2, the keys on the body cannot be used unless the movable cover is opened and the keys on the movable cover cannot be used unless the movable cover is closed. Since both groups of keys cannot be used simultaneously, this type of telephone is inconvenient to handle. Besides, the display area cannot be increased so much.

Folding type phones as shown in FIG. 3 are troublesome to handle because it is impossible to talk or view the display without opening the body each time a call is received.

Furthermore, the rotational portable telephone disclosed in Japanese Patent Application Laid-Open No. 7-288860 is inconvenient to handle because a user cannot communicate unless he/she rotates and holds in a moderate position the housing equipped with a keypad. Also, since the two housings rotate facing each other the hinge is liable to wear and vulnerable to external shocks. The portable telephone disclosed in Japanese Patent Application Laid-Open No. 11-163985 has similar problems.

SUMMARY OF THE INVENTION

An object of the present invention is to provide a portable telephone apparatus allowing a user to easily see a display and allowing easy data communication.

Another object of the present invention is to provide a portable telephone apparatus which is easy to handle and has superior mechanical strength.

A portable telephone according to the present invention includes three units: a body, speaker unit, and display unit. It features a structure in which the display unit and speaker unit are connected via a first hinge while the speaker unit and body are connected via a second hinge.

In the above structure, it is possible to change between two forms by sliding the parts through rotation of the two hinges: a first state in which the display and speaker units are retracted in the body and a second state in which the two units are extended from the body. Infrequently used key buttons may be exposed in the extended state, while they are covered in the retracted state. Frequently used key buttons can be exposed both in the retracted and extended states.

These structural features make it possible to increase the number of key buttons and to expand the area of the display window simultaneously. Also, These structural features provide a easy-to-handle, mechanically strong portable telephone.

Further, the extended state by sliding retains the display unit in the form lying at a tilt angle with respect to the body. Therefore, the extended state provides an increase of the visibility for a user and making a display easy to see.

Additionally, a structure of a compartment for containing the speaker and display units should preferably be equipped with lateral walls. If the body is equipped with such lateral walls, friction is produced between the speaker unit and the body during sliding from the retracted state to the extended state. This friction restricts needless motion of the speaker unit with respect to the body and allows the speaker unit to be held stably at a certain angle. Consequently, the present invention provides an easier-to-handle, mechanically strong portable telephone with good visibility for the user.

BRIEF DESCRIPTION OF THE DRAWINGS

FIG. 3 is a perspective view showing an external configuration of a conventional folding type phone;

DETAILED DESCRIPTION OF THE PREFERRED EMBODIMENTS

Figure 1:
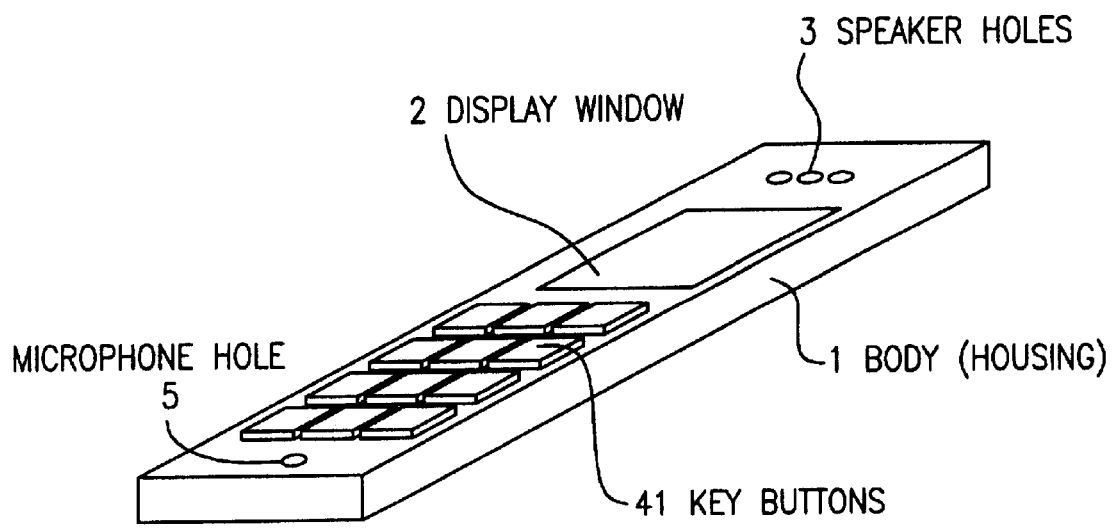
FIG. 1 is a perspective view showing an external configuration of a conventional standard type portable telephone.
Figure 2:
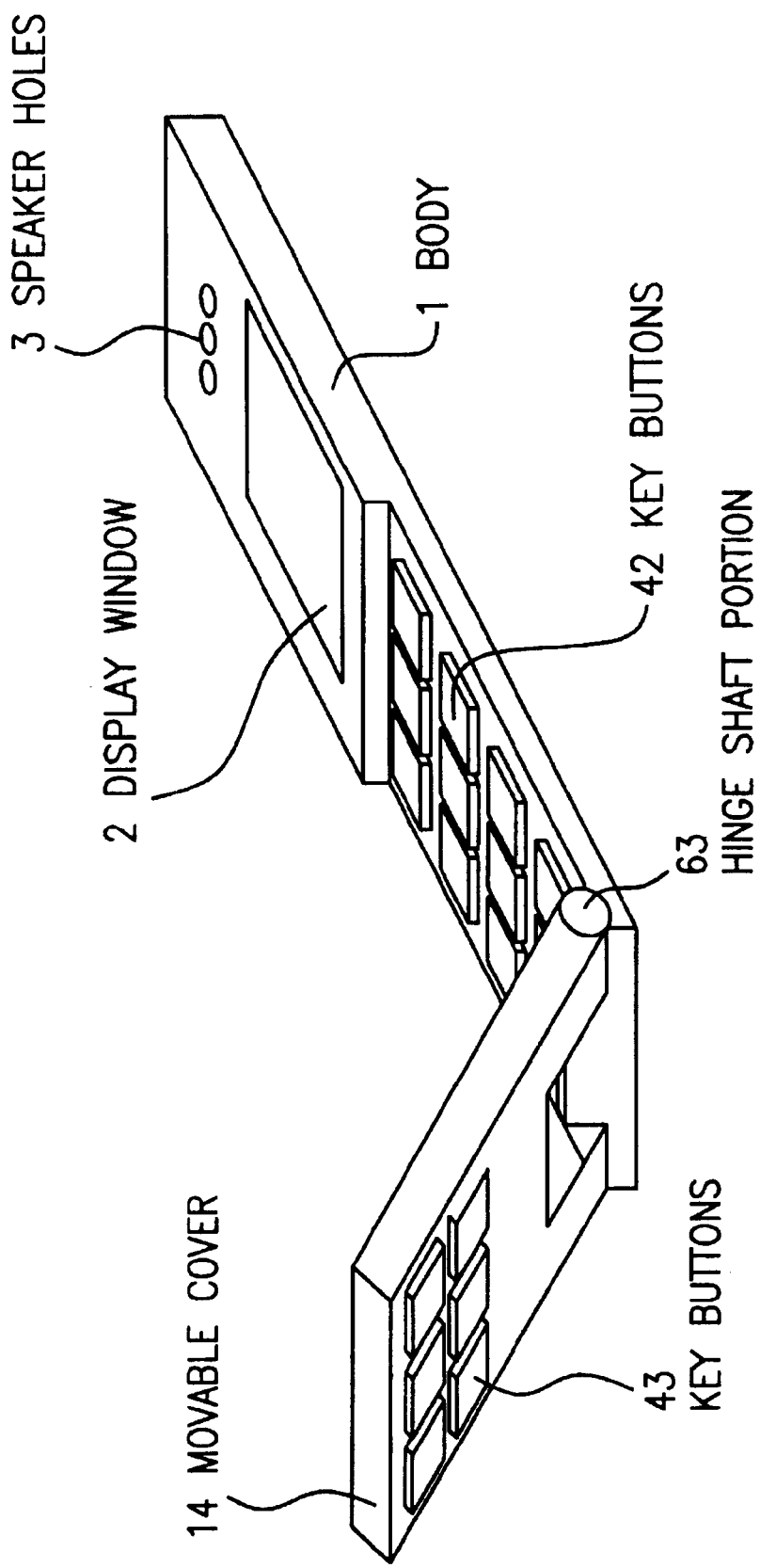
FIG. 2 is a perspective view showing an external configuration of a conventional portable telephone with a movable cover.
Figure 4A:
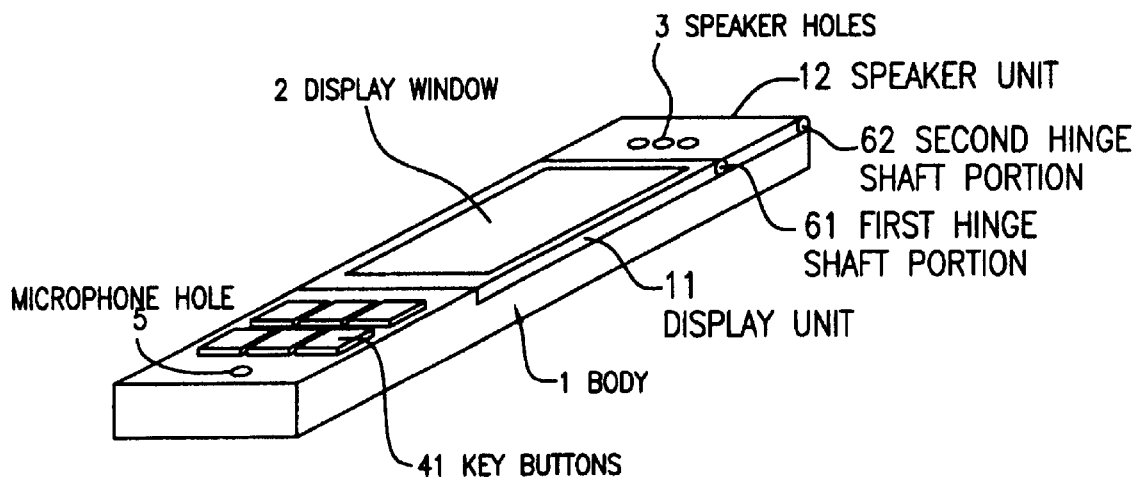
FIG. 4A is a perspective view showing an external configuration of a slide type portable telephone according to a first embodiment of the present invention.
Figure 4B:
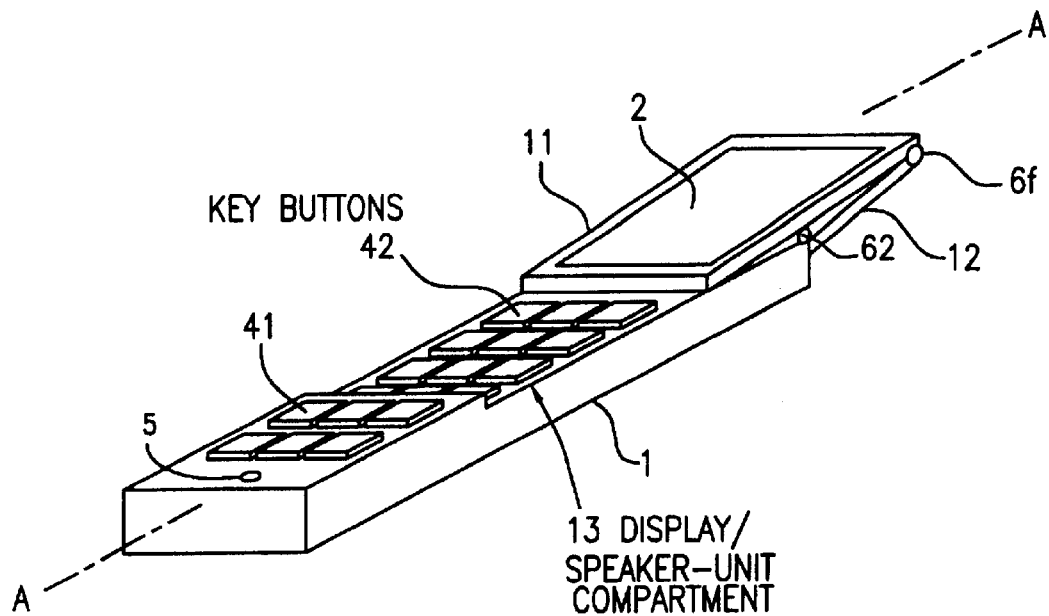
FIG. 4B is an external perspective view showing an open state in which the display unit and speaker unit of the first embodiment are slid out.

As shown in FIG. 4A and FIG. 4B, a portable telephone according to a first embodiment of the present invention employs a layout that concentrates functions on a major surface of a body or housing 1 with a microphone hole 5, key buttons 41, a display window 2, and speaker holes 3 disposed in this order.

The display window 2 is provided on the major surface of the display unit 11 and the speaker holes 3 are provided in the major surface of the speaker unit 12. As described later, the display unit 11 is provided with a display 21 and the speaker unit 12 is provided with a speaker 31 (see FIG. 5).

The display unit 11 and speaker unit 12 are rotatably connected via a first hinge shaft portion 61 while the speaker unit 12 and the body 1 are rotatably connected via a second hinge shaft portion 62. The rotation of these hinge shafts allows the display unit 11 and speaker unit 12 to be extended from the body 1 as shown in FIG. 4B. Also, as shown in FIG. 4A, the rotation of these hinge shafts allows the display unit 11 and speaker unit 12 to be retracted in a display/speaker-unit containing space or compartment 13 formed on the major-surface side of the body 1.

Furthermore, frequently used key buttons (an abbreviated dialing memory search key, on/off-hook key, etc.) 41 are disposed in an exposed lower part of the body 1. As shown in FIG. 4B, infrequently used key buttons 42 are disposed on a predetermined part of the display/speaker-unit compartment 13, which is exposed only when the display unit 11 is opened. This structure makes it possible to increase the number of key buttons and to expand the area of the display window. With the units 11 and 12 normally retracted as shown in FIG. 4A (hereafter referred to as a retracted state), a call can be originated and received and thus the normal telephone function can be used without any particular inconvenience.

FIG. 4B shows an extended state of the display unit 11 and speaker unit 12 that are extended from the display/speaker-unit compartment 13 by the sliding operation causes by rotation of the two hinge shafts. In this extended state, the infrequently used key buttons 42 which are located right below the display unit 11 in the retracted state are exposed. These key buttons 42 allow input operations for various functions. And, these key buttons 42 are infrequently used numeric keys and other key buttons. Therefore, there is no problem even if they are not operable being hidden under the units during normal use (in the retracted state) as long as frequently used keys such as the abbreviated memory screen key are located on the surface.

As a result of this extension by sliding, the speaker unit 12 is turned over along an arc about the second hinge shaft portion 62. At this time, the display unit 11 slides, in sync with the motion of the speaker unit 12 and accompanying with the rotation of the first hinge shaft portion 61, towards the surface of the speaker unit 12 opposite to the surface with speaker holes 3. When sliding is complete, the upper tip part of the display unit 11 and the first hinge shaft portion 61 connected thereto are placed beyond the second hinge shaft portion 62. Consequently, the display unit 11 forms a tilt angle with the body 1, increasing the visibility of the display window 2 for a user.

Figure 5:
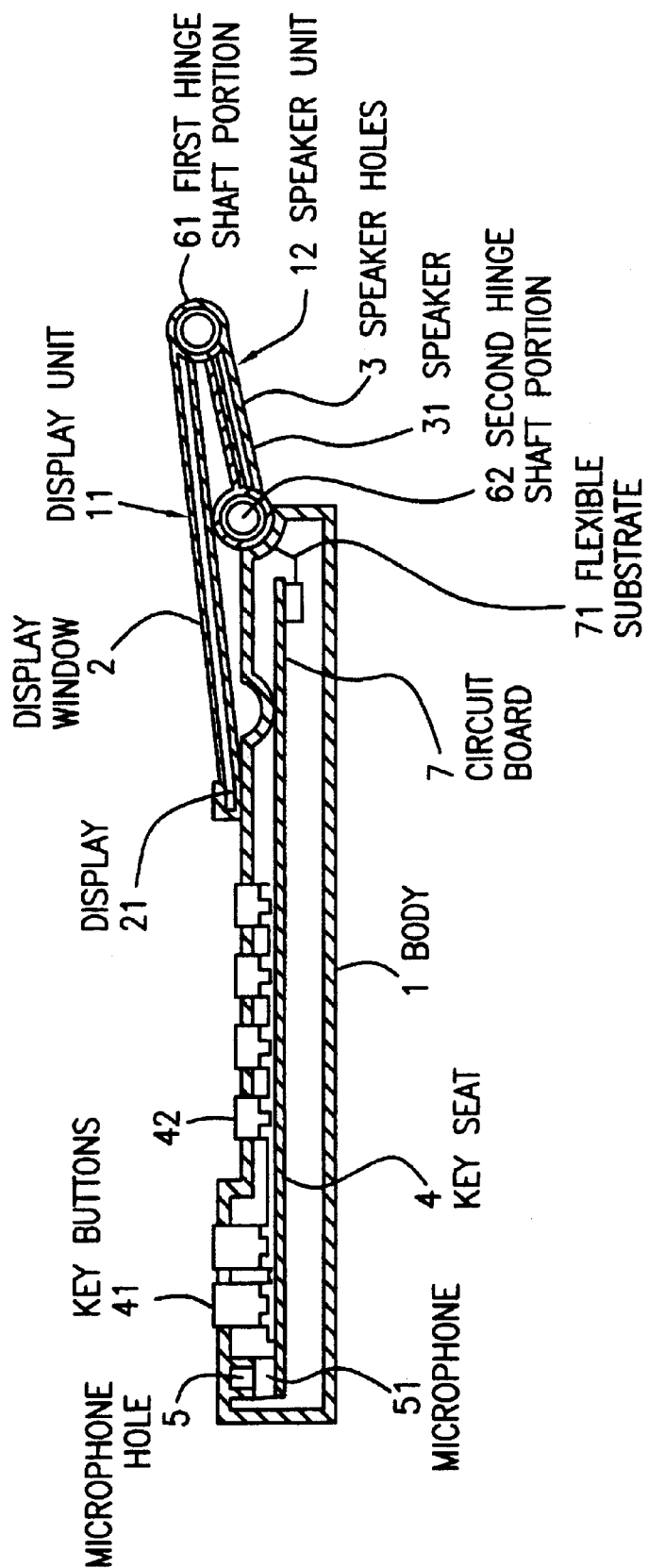
FIG. 5 is an A—A sectional view of the slide type portable telephone shown in FIGS. 4A and 4B.

Referring to FIG. 5, the key buttons 41 and 42 and the microphone 51 for voice input are placed in position on the same circuit board 7. The key buttons 41 and 42 are placed on the same key seats 4 disposed on the circuit board 7. The circuit board 7 is mounted on an inner wall of the body 1 such that the microphone 51 is aligned with the microphone hole 5.

In addition, a flexible substrate 71 is laid through the speaker unit 12 starting from the circuit board 7 and the other end of the flexible substrate 71 is connected to the display 21 in the display unit 11. The flexible substrate 71 is mounted making one turn each around the outer side of the two hinge shaft portions 61 and 62 so that it can meet movements of the hinge shaft portion 61 and 62 and an acute angle bend can be avoided. The speaker 31 is mounted on the flexible substrate 71 within the speaker unit 12.

Preferably, a torque shaft bush or the like should be used for the hinge shaft portions 61 and 62 to restrict needless motions, thereby improving convenience in handling and increasing mechanical strength.

According to a second embodiment, lateral walls may be provided longitudinally along both sides of the display/speaker-unit compartment 13 for use as guide walls during sliding.

In this case, friction is produced by the display unit 11 and speaker unit 12 sliding along both the lateral walls on the body 1 when they are extended. This friction prevents, to some extent, the hinge shaft portions 61 and 62 from moving freely and thus the user can set the tilt angle of the display window 2 as desired for better visibility.

The second embodiment is not different in the basic configuration than the above-described first embodiment. That is, it consists of three units of the speaker unit, display unit, and body, and changes between two forms of the retracted state and extended state by rotation of the two hinge shafts.

Figure 6A:
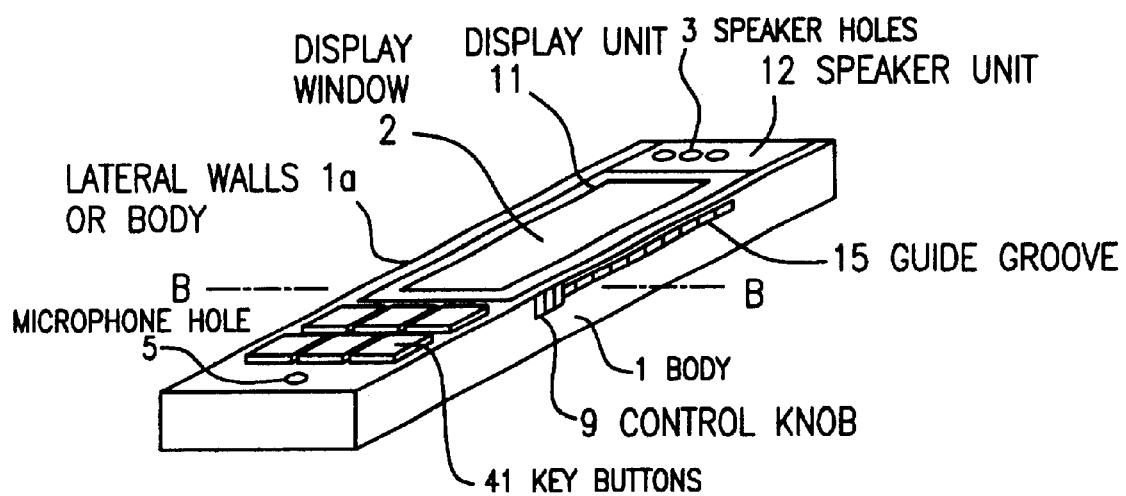
FIG. 6A is a perspective view showing an external configuration of the slide type portable telephone according to a second embodiment of the present invention.
Figure 6B:
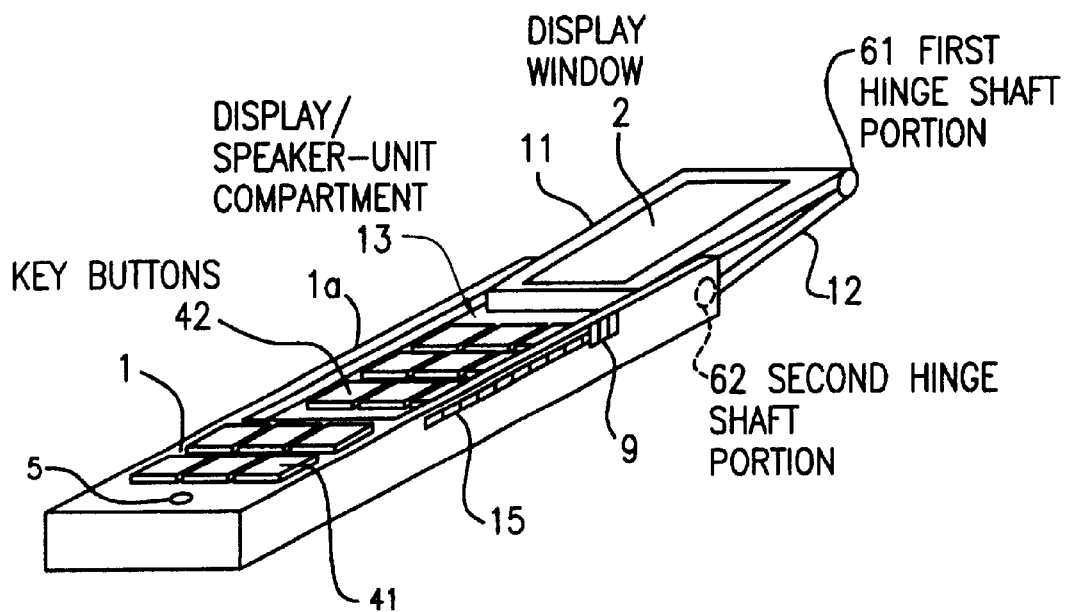
FIG. 6B is an external perspective view showing the slide type portable telephone of the second embodiment with the display unit and speaker unit slid out.
Figure 7:
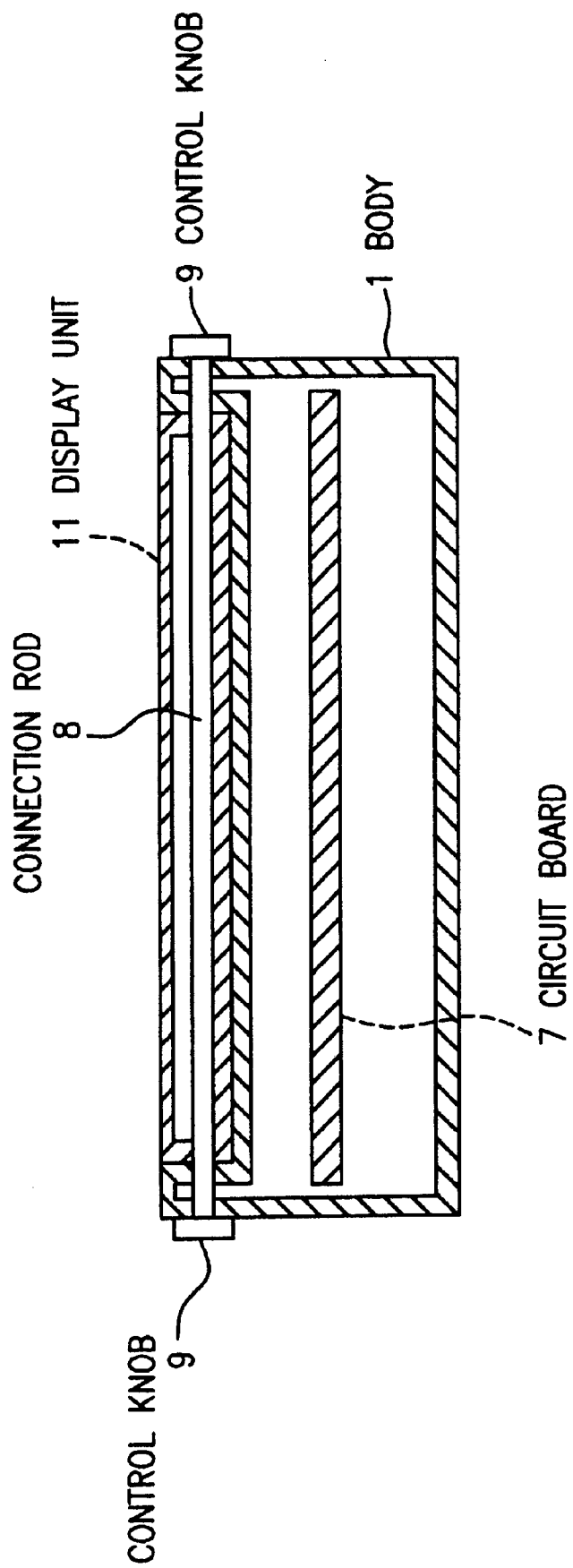
FIG. 7 is a B—B sectional view of the slide type portable telephone shown in FIGS. 6A and 6B.

FIG. 6A is a perspective view of a slide-type portable telephone according to the second embodiment. FIG. 6B is a perspective view of the slide-type portable telephone with the display unit 11 and speaker unit 12 extended by sliding. FIG. 7 is a sectional view along the B—B line in FIG. 6A.

In this portable telephone, guide grooves 15 of a predetermined length are provided in lateral walls along longitudinally both sides of the display/speaker-unit compartment 13. A connection rod 8 is secured to the lower free end of the display unit 11 passing through the guide grooves 15. Moreover, control knobs 9 are fixed to the ends of the connection rod 8, respectively. This portable telephone possesses a slide mechanism for sliding the display unit 11 and speaker unit 12 by moving the control knobs 9 along the guide grooves 15.

With the slide mechanism described above, the user can set the tilt angle of the display unit 11 with respect to the body 1 for good visibility of the display window 2 by positioning the control knobs 9 at an appropriate position. As a consequence, the visibility is more increasing for the user.

In the portable telephone according to the second embodiment, the lateral walls are formed longitudinally along both sides of the display/speaker-unit compartment 13 to generate friction between the movable section composed of the display and speaker units 11 and 12 and the body 1. Additionally, the slide mechanism restricts the movement of the display unit 11 and speaker unit 12. Consequently, the tilt angle of the display unit 11 with respect to the body 1 can be set stably for better visibility.

As described above, according to the present invention, the portable telephone has a structure consisting of three units: display unit, speaker unit, and body. The three units are connected at variable angles by means for using two hinge shafts. This makes it possible to increase the number of key buttons and to expand the area of the display window. Moreover, the display unit can be set at a tilt angle with respect to the body, increasing the visibility for the user.

Furthermore, the lateral walls are formed longitudinally along both sides of the display/speaker-unit compartment on the body to generate friction between the display and speaker units and the body. Consequently, the tilt angle of the display unit with respect to the body can be held stably to further improve visibility for the user.

What is claimed is:

1. A portable telephone apparatus comprising:
   a display unit having a display window on a major surface thereof;
   a speaker unit having speaker holes formed on a major surface thereof, wherein one side of the speaker unit is rotatably connected to one side of the display unit by a first hinge shaft portion; and
   a housing rotatably connected to the other side of the speaker unit by a second hinge shaft portion, the housing having a first major surface and a second major surface, the first major surface having a microphone hole formed at a predetermined position thereof, wherein the second major surface is covered with the display unit and the speaker unit when the display unit and the speaker unit are extended,
   wherein the display unit and the speaker unit are folded by sliding so that a part of the second major surface is exposed.

2. The portable telephone apparatus according to claim 1, wherein, when the display unit and the speaker unit are folded, the display window of the display unit is angled so that a display on the display window is easily seen.

3. The portable telephone apparatus according to claim 1, wherein frequently used key buttons are provided on the first major surface and infrequently used key buttons are provided on the second major surface, wherein the first major surface is normally exposed and the second major surface is normally covered with the display unit and the speaker unit.

4. A portable telephone apparatus comprising:
   a display unit having a display window on a major surface thereof;
   a speaker unit having speaker holes formed on a major surface thereof, wherein one side of the speaker unit is rotatable connected to one side of the display unit by a first hinge shaft portion;
   a housing rotatably connected to the other side of the speaker unit by a second hinge shaft portion, the housing having a first major surface and a second major surface, the first major surface having a microphone hole formed at a predetermined position thereof, wherein the second major surface is covered with the display unit and the speaker unit when the display unit and the speaker unit are extended; and
   guide walls provided respectively in both longitudinal sides of the second major surface of the housing such that the other side of the display unit is sandwiched between the guide walls,
   wherein the display unit and the speaker unit are folded and unfolded by sliding both end of the other side of the display unit along the guide walls.

5. The portable telephone apparatus according to claim 4, wherein the guide walls has guide grooves formed therein, respectively, and the both ends of the other side of the display unit are slidably engaged with the guide grooves to produce friction, wherein the both ends are fixed to knob members each protruding outwardly from the guide grooves.

6. The portable telephone apparatus according to claim 4, wherein, when the display unit and the speaker unit are folded, the display window of the display unit is angled so that a display on the display window is easily seen.

7. The portable telephone apparatus according to claim 5, wherein, when the display unit and the speaker unit are folded, a part of the second major surface is exposed.

8. The portable telephone apparatus according to claim 7, wherein frequently used key buttons are provided on the first major surface and infrequently used key buttons are provided on the second major surface, wherein the first major surface is normally exposed and the second major surface is normally covered with the display unit and the speaker unit.

9. A portable telephone comprising:
   a display unit having a display and a display window;
   a speaker unit having a speaker and speaker holes;
   a body having a microphone hole, key buttons, and a display/speaker-unit compartment in a major side thereof;
   a first hinge rotatably connecting the display unit and the speaker unit; and
   a second hinge rotatably connecting the speaker unit and the body so that the display unit and the speaker unit are slidably opened and closed.

10. The portable telephone according to claim 9, wherein:
    when the telephone is folded, the display unit and the speaker unit are retracted in said display/speaker-unit compartment along a longitudinal direction of the body;
    when the telephone is slid open, the speaker unit is turned over along an arc about the second hinge and the display unit slides out, with rotation of the first hinge, towards a surface of the speaker unit opposite to a surface with the speaker holes; and
    when sliding is complete, the first hinge which is an upper tip part of the display unit is placed beyond the second hinge.

11. The portable telephone according to claim 10, wherein the display unit makes a certain tilt angle with respect to a major surface of the body by adjusting a distance of the sliding.

12. The portable telephone according to claim 10, wherein:
    frequently used key buttons are arranged in a normally exposed lower part of the body; and
    infrequently used key buttons are arranged in a part of the display/speaker-unit compartment exposed by the sliding.

13. The portable telephone according to claim 12, wherein:
    in an extended state, the infrequently used key buttons which are located right below the display unit in the retracted state are exposed; and
    in a retracted state, only the frequently used keys are exposed.

14. The portable telephone according to claim 9, further comprising:

lateral walls formed longitudinally along both sides of the display/speaker-unit compartment.

15. The portable telephone according to claim 14, wherein:

the portable telephone has a slide mechanism in which the speaker/speaker-unit compartment has guide grooves of a predetermined length formed in the lateral walls, a pair of control knobs connected to both ends of a connection rod secured to a free end of the display unit is fitted with the guide grooves, and the display unit and the speaker unit are slid by sliding the control knobs coupled by the connection rod in the guide grooves.

16. The portable telephone according to claim 14, wherein a friction produced between the two lateral walls of the display/speaker-unit compartment and the display and speaker units allows the display unit to be fixed stably to the body at a desired tilt angle.

17. The portable telephone according to claim 9, wherein the first and second hinges each has torque shaft bushes therein.

* * * * *